United States Patent
Shimakami

(10) Patent No.: US 9,919,695 B2
(45) Date of Patent: Mar. 20, 2018

(54) HYBRID VEHICLE

(71) Applicant: TOYOTA JIDOSHA KABUSHIKI KAISHA, Toyota-shi, Aichi-ken (JP)

(72) Inventor: Shinichi Shimakami, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 10 days.

(21) Appl. No.: 15/249,727

(22) Filed: Aug. 29, 2016

(65) Prior Publication Data
US 2017/0066432 A1 Mar. 9, 2017

(30) Foreign Application Priority Data
Sep. 4, 2015 (JP) .................................. 2015-174614

(51) Int. Cl.
*B60W 10/06* (2006.01)
*B60W 10/08* (2006.01)
(Continued)

(52) U.S. Cl.
CPC ............. *B60W 20/13* (2016.01); *B60K 6/365* (2013.01); *B60K 6/445* (2013.01); *B60W 10/06* (2013.01);
(Continued)

(58) Field of Classification Search
CPC ...... B60W 20/13; B60W 10/06; B60W 10/08; B60W 2510/0638; B60W 2710/08;
(Continued)

(56) References Cited

U.S. PATENT DOCUMENTS

| | | | | |
|---|---|---|---|---|
| 6,044,922 A * | 4/2000 | Field | ....................... | B60K 6/40 180/65.23 |
| 6,070,680 A * | 6/2000 | Oyama | .................... | B60K 6/48 180/65.25 |

(Continued)

FOREIGN PATENT DOCUMENTS

JP  2008-193772  8/2008
JP  2008247225 A  * 10/2008
(Continued)

OTHER PUBLICATIONS

Xinhui et al., "Research for energy management mode of parallel hydraulic hybrid vehicle," Year: 2011, vol. 7, pp. 3824-3827.*
(Continued)

*Primary Examiner* — Tuan C To
(74) *Attorney, Agent, or Firm* — Finnegan, Henderson, Farabow, Garrett & Dunner, LLP

(57) ABSTRACT

In a hybrid vehicle, an electronic control unit is configured to: control an engine such that the engine is started and a self-sustained operation is performed in a case where i) torque for forward traveling is output from a second motor, ii) sliding down of the vehicle is tentatively detected before the sliding down is detected, and iii) permissible charge electric power is equal to or smaller than first prescribed electric power and rotation of the engine is in a stopped state; and execute drive control such that fuel injection is stopped and the engine is driven by a first motor at a rotational speed larger than that before the sliding down is detected in a case where i) the sliding down is detected thereafter and ii) the permissible charge electric power is equal to or smaller than second prescribed electric power.

3 Claims, 3 Drawing Sheets

(51) Int. Cl.
  *B60K 6/365* (2007.10)
  *B60W 20/13* (2016.01)
  *B60K 6/445* (2007.10)
  *B60W 10/26* (2006.01)
  *B60W 30/18* (2012.01)
  *B60W 20/10* (2016.01)

(52) U.S. Cl.
  CPC ............ *B60W 10/08* (2013.01); *B60W 10/26* (2013.01); *B60W 20/10* (2013.01); *B60W 30/18118* (2013.01); *B60W 2510/083* (2013.01); *B60W 2510/244* (2013.01); *B60W 2710/0644* (2013.01); *B60W 2710/244* (2013.01); *B60Y 2200/92* (2013.01); *Y02T 10/7258* (2013.01); *Y10S 903/91* (2013.01); *Y10S 903/93* (2013.01)

(58) Field of Classification Search
  CPC ..... B60K 6/365; Y10S 903/91; Y10S 903/93; B60Y 2200/92; B60Y 2300/182; B60Y 2300/192; B60Y 2300/432; B60Y 2300/60
  See application file for complete search history.

(56) References Cited

U.S. PATENT DOCUMENTS

| | | | | |
|---|---|---|---|---|
| 6,470,983 | B1* | 10/2002 | Amano | B60K 6/365 |
| | | | | 180/65.235 |
| 6,563,230 | B2* | 5/2003 | Nada | F02N 11/04 |
| | | | | 180/65.235 |
| 7,237,634 | B2* | 7/2007 | Severinsky | B60H 1/004 |
| | | | | 180/65.23 |
| 2013/0226379 | A1* | 8/2013 | Hirai | B60K 6/445 |
| | | | | 701/22 |
| 2014/0088807 | A1* | 3/2014 | Saito | B60K 6/445 |
| | | | | 701/22 |
| 2014/0180517 | A1 | 6/2014 | Endo | |
| 2014/0277885 | A1* | 9/2014 | Morimoto | B60W 20/108 |
| | | | | 701/22 |
| 2014/0350764 | A1* | 11/2014 | Arai | B60W 40/10 |
| | | | | 701/22 |
| 2015/0057860 | A1* | 2/2015 | Katakura | B60K 6/48 |
| | | | | 701/22 |
| 2015/0353070 | A1* | 12/2015 | Matsui | B60K 6/48 |
| | | | | 701/22 |
| 2016/0215479 | A1* | 7/2016 | Ishihara | E02F 9/2075 |

FOREIGN PATENT DOCUMENTS

| | | | |
|---|---|---|---|
| JP | 2010188794 A | * | 9/2010 |
| JP | 2014-125078 | | 7/2014 |
| JP | 2015074296 A | * | 4/2015 |

OTHER PUBLICATIONS

Kouhei et al., "Charging and discharging cycle design for performance evaluation of HV batteries," Year: 2012, pp. 224-228.*

* cited by examiner

HYBRID VEHICLE

INCORPORATION BY REFERENCE

The disclosure of Japanese Patent Application No. 2015-174614 filed on Sep. 4, 2015 including the specification, drawings and abstract is incorporated herein by reference in its entirety.

BACKGROUND OF THE INVENTION

1. Field of the Invention

The invention relates to a hybrid vehicle.

2. Description of Related Art

It has been suggested that, in an electric vehicle that includes a traveling generator motor; a high-voltage battery connected to the traveling generator motor via a power line; and an electrical load (e.g., a DC-DC converter or a compressor of an air conditioner) connected to the power line, the electrical load is actuated at a time when sliding down of the vehicle is detected during output of torque from the generator motor (for example, see Japanese Patent Application Publication No. 2008-193772 (JP 2008-193772 A)). In this electric vehicle, when the sliding down of the vehicle is detected, electric power that is generated by regenerative operation of the generator motor or electric power of the high-voltage battery is consumed by the electrical load. In this way, the torque from the generator motor is prevented from being limited.

SUMMARY OF THE INVENTION

In a hybrid vehicle in which an engine, a first motor, a drive shaft connected to an axle, and a second motor are connected to three rotational elements of a planetary gear such that the first motor, the engine, the drive shaft, and the second motor are arranged in a stated order in a collinear diagram and in which electric power is exchanged between each of the first motor and the second motor and a battery, when sliding down of the vehicle is detected, the electric power is consumed by the electrical load, and in addition, the electric power may be consumed by stopping fuel injection of the engine after a start of the engine and driving the engine using the first motor. At this time, in the case where the engine is started after detection of the sliding down, it takes long time to increase a rotational speed of the engine, and thus it may take long time to increase the electric power consumption of the first motor. In the case where permissible charge electric power of the battery is relatively large, a possibility that torque from the second motor is relatively significantly limited (limited to a value whose absolute value is relatively small) is low even when it takes long time to increase the electric power consumption of the first motor. However, in the case where the permissible charge electric power is relatively small, the torque from the second motor may be relatively significantly limited. Thus, a sliding down speed of the vehicle may become relatively large.

The invention provides a hybrid vehicle that makes it possible to prevent a sliding down speed of the vehicle from becoming relatively large.

A hybrid vehicle according to an aspect of the invention includes an engine; a first motor; a planetary gear in which three rotational elements are connected to a rotational shaft of the first motor, an output shaft of the engine, and a drive shaft connected to an axle such that the rotational shaft, the output shaft, and the drive shaft are arranged in a stated order in a collinear diagram; a second motor connected to the drive shaft; a battery that exchanges electric power with the first motor and the second motor; and an electronic control unit. The electronic control unit is configured to: control at least the second motor such that the hybrid vehicle travels in a state where charge electric power of the battery is within a range defined by permissible charge electric power and discharge electric power of the battery is in a range defined by permissible discharge electric power; control the engine such that the engine is started and a self-sustained operation of the engine is performed in a case where i) torque for forward traveling is output from the second motor, ii) sliding down of the hybrid vehicle is tentatively detected before the sliding down is detected, and iii) the permissible charge electric power is equal to or smaller than first prescribed electric power and rotation of the engine is in a stopped state; execute drive control that controls the engine such that fuel injection of the engine is stopped and controls the first motor such that the engine is driven by the first motor at a rotational speed larger than a rotational speed before the sliding down is detected in a case where i) the sliding down is detected after the self-sustained operation of the engine is started and ii) the permissible charge electric power is equal to or smaller than second prescribed electric power that is equal to or smaller than the first prescribed electric power; and continue the self-sustained operation of the engine in a case where the sliding down is not detected or the permissible charge electric power is larger than the second prescribed electric power after the self-sustained operation of the engine is started.

In the hybrid vehicle according to the above aspect of the invention, at least the second motor is controlled such that the hybrid vehicle travels in the state where the charge electric power of the battery is within the range defined by the permissible charge electric power and the discharge electric power of the battery is in the range defined by the permissible discharge electric power. The engine is controlled such that the engine is started and the self-sustained operation of the engine is performed in the case where i) the torque for forward traveling is output from the second motor, ii) the sliding down of the hybrid vehicle is tentatively detected before the sliding down is detected, and iii) the permissible charge electric power is equal to or smaller than the first prescribed electric power and the rotation of the engine is in the stopped state. In the case where i) the sliding down is detected thereafter, that is, after the self-sustained operation of the engine is started and ii) the permissible charge electric power is equal to or smaller than the second prescribed electric power that is equal to or smaller than the first prescribed electric power, the drive control is executed, the drive control controlling the engine such that fuel injection of the engine is stopped and controlling the first motor such that the engine is driven by the first motor at the rotational speed larger than the rotational speed before the sliding down is detected. In the case where the sliding down is not detected or the permissible charge electric power is larger than the second prescribed electric power after the self-sustained operation of the engine is started, the self-sustained operation of the engine is continued. Thus, the rotational speed of the engine can be promptly increased, and the electric power consumption of the first motor can be promptly increased, as compared to a case in which, when the sliding down is detected and the permissible charge electric power is equal to or smaller than the second prescribed electric power, the engine is started and thereafter the drive control is started. As a result, it is possible to prevent torque (regenerative torque) from the second motor from being relatively significantly limited (limited to a value whose absolute value is relatively small). Therefore, it is possible to prevent a sliding down speed of the vehicle from becoming relatively large.

In the above-described aspect, the electronic control unit may be configured to execute the drive control such that the engine is driven at a larger rotational speed when a sliding down speed is large than when the sliding down speed is small in the case where i) the torque for forward traveling is output from the second motor, ii) the sliding down is detected, and iii) the permissible charge electric power is equal to or smaller than the second prescribed electric power. Electric power that is generated by regenerative operation of the second motor increases as the sliding down speed increases. However, as the electric power that is generated by the regenerative operation of the second motor increases, the rotational speed of the engine is increased so as to increase the electric power consumption of the first motor. In this way, it is possible to further appropriately prevent the torque (the regenerative torque) from the second motor from being relatively significantly limited.

In the above-described aspect, the electronic control unit may be configured not to execute the drive control when a voltage of the battery is lower than a prescribed voltage or when a state of charge of the battery is lower than a prescribed ratio even in the case where i) the torque for forward traveling is output from the second motor, ii) the sliding down is detected, and iii) the permissible charge electric power is equal to or smaller than the second prescribed electric power. In this way, the battery can be protected. Here, as the "prescribed voltage", for example, a permissible lower limit voltage of the battery, or a value slightly higher than the permissible lower limit voltage can be used. As the "prescribed ratio", for example, a permissible lower limit ratio of the battery, or a value slightly higher than the permissible lower limit ratio can be used.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described with reference to the drawings.

Figure 1:
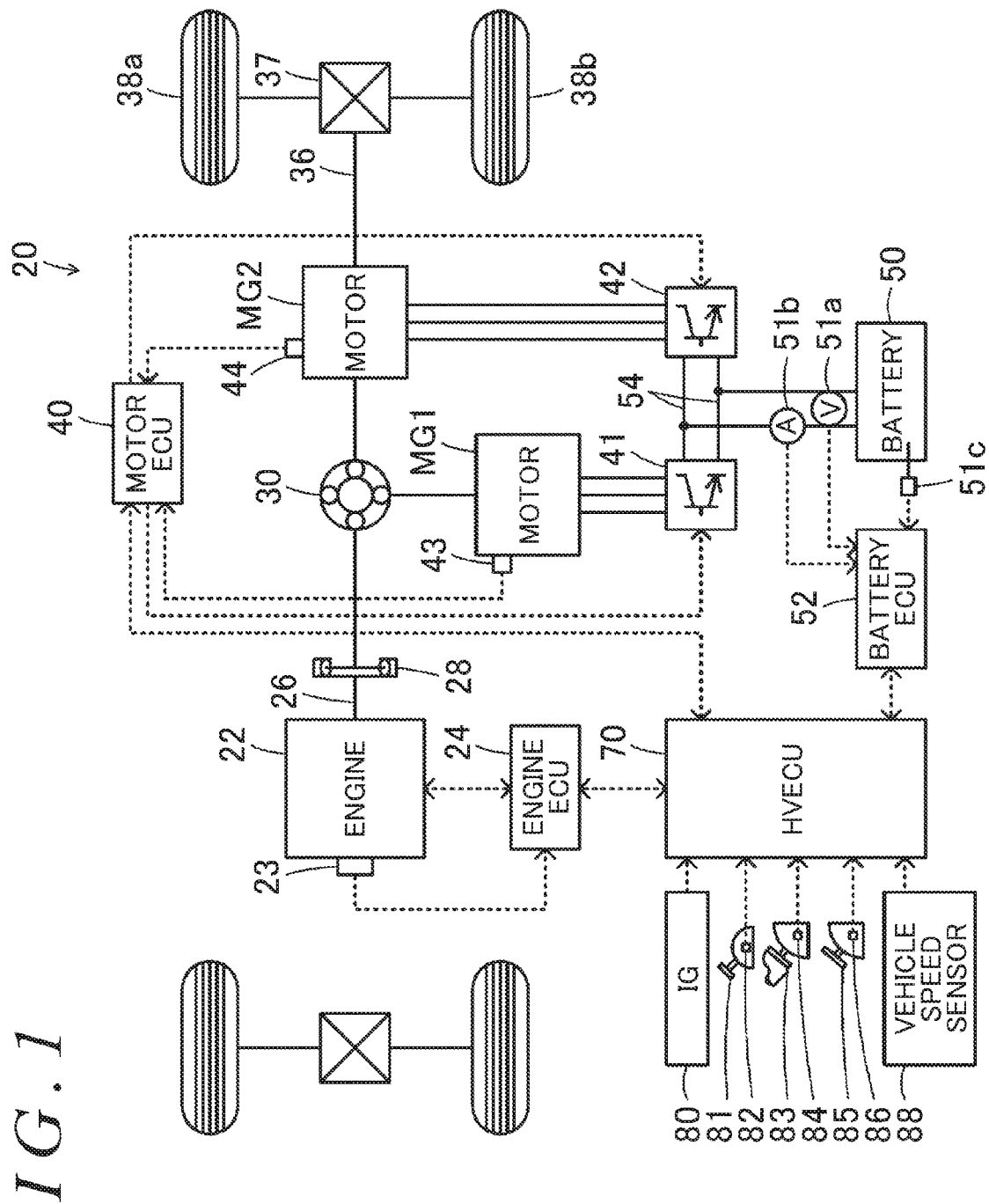
FIG. 1 is a configuration diagram that schematically shows a configuration of a hybrid vehicle according to an embodiment of the invention.

FIG. 1 is a configuration diagram that schematically shows a configuration of a hybrid vehicle 20 according to the embodiment of the invention. As shown in FIG. 1, the hybrid vehicle 20 of the embodiment includes an engine 22, a planetary gear 30, motors MG1, MG2, inverters 41, 42, a battery 50, and a hybrid electronic control unit (hereinafter referred to as an "HVECU") 70.

The engine 22 is configured as an internal combustion engine that outputs power by using fuel such as gasoline or diesel fuel. An operation of this engine 22 is controlled by an engine electronic control unit (hereinafter referred to as an "engine ECU") 24.

Although not shown, the engine ECU 24 is configured as a microprocessor that includes a Central Processing Unit (CPU) as a central component, and further includes, in addition to the CPU, a Read-Only Memory (ROM) that stores a processing program, a Random-Access Memory (RAM) that temporarily stores data, input and output ports, and a communication port. The engine ECU 24 receives signals, which are necessary to control the operation of the engine 22, from various sensors via the input port. Signals that are received by the engine ECU 24 include a signal indicative of a crank angle $\theta cr$ from a crank position sensor 23 that detects a rotational position of a crankshaft 26 of the engine 22, and a signal indicative of a throttle opening degree TH from a throttle valve position sensor that detects a position of a throttle valve.

The engine ECU 24 outputs various control signals for controlling the operation of the engine 22 via the output port. The control signals that are output from the engine ECU 24 include a control signal output to a throttle motor that adjusts the position of the throttle valve, a control signal output to a fuel injection valve, and a control signal output to an ignition coil that is integrated with an igniter.

The engine ECU 24 is connected to the HVECU 70 via the communication port, and controls the operation of the engine 22 in accordance with a control signal from the HVECU 70. In addition, the engine ECU 24 outputs data on an operation state of the engine 22 to the HVECU 70, when necessary. The engine ECU 24 calculates a rotational speed of the crankshaft 26, that is, a rotational speed Ne of the engine 22 on the basis of the crank angle $\theta cr$ from the crank position sensor 23.

The planetary gear 30 is configured as a single-pinion type planetary gear mechanism. A rotor of the motor MG1 is connected to a sun gear of the planetary gear 30. A drive shaft 36 that is connected to drive wheels 38a, 38b via a differential gear 37 is connected to a ring gear of the planetary gear 30. The crankshaft 26 of the engine 22 is connected to a carrier of the planetary gear 30 via a damper 28.

The motor MG1 is configured as a synchronous generator motor, for example. As described above, the rotor of the motor MG1 is connected to the sun gear of the planetary gear 30. The motor MG2 is configured as a synchronous generator motor, for example, and a rotor of the motor MG2 is connected to the drive shaft 36. The inverters 41, 42 are connected to the battery 50 via a power line 54. The motors MG1, MG2 are rotationally driven when a plurality of switching elements (not shown) of the inverters 41, 42 is subjected to switching control by a motor electronic control unit (hereinafter referred to as a "motor ECU") 40.

Although not shown, the motor ECU 40 is configured as a microprocessor that includes a CPU as a central component, and further includes, in addition to the CPU, a ROM that stores a processing program, a RAM that temporarily stores data, input and output ports, and a communication port. The motor ECU 40 receives signals, which are necessary to control operation of the motors MG1, MG2, from various sensors via the input port. The signals that are received by the motor ECU 40 include signals indicative of rotational positions $\theta m1$, $\theta m2$ from rotational position detection sensors 43, 44 that respectively detect rotational positions of the rotors of the motors MG1, MG2, and a signal indicative of a phase current from a current sensor that detects a current flowing through each phase of the motors MG1, MG2.

The motor ECU 40 outputs, for example, switching control signals to the plurality of switching elements (not shown) of the inverters 41, 42, via the output port. The motor ECU 40 is connected to the HVECU 70 via the communication port, and controls driving of the motors MG1, MG2 in accordance with a control signal from the HVECU 70. In addition, the motor ECU 40 outputs data on driving states of the motors MG1, MG2 to the HVECU 70, when necessary. The motor ECU 40 calculates rotational speeds Nm1, Nm2 of the motors MG1, MG2 on the basis of the rotational positions θm1, θm2 of the rotors of the motors MG1, MG2 from the rotational position detection sensors 43, 44.

The battery 50 is configured as a lithium-ion secondary battery, for example. As described above, this battery 50 is connected to the inverters 41, 42 via the power line 54. The battery 50 is managed by a battery electronic control unit (hereinafter referred to as a "battery ECU") 52.

Although not shown, the battery ECU 52 is configured as a microprocessor that includes a CPU as a central component, and further includes, in addition to the CPU, a ROM that stores a processing program, a RAM that temporarily stores data, input and output ports, and a communication port. The battery ECU 52 receives signals, which are necessary to manage the battery 50, from various sensors via the input port. The signals that are received by the battery ECU 52 include a signal indicative of a battery voltage Vb from a voltage sensor 51a that is installed between terminals of the battery 50, a signal indicative of a battery current Ib from a current sensor 51b that is attached to the output terminal of the battery 50 (the battery current Ib is a positive value when being discharged from the battery 50), and a signal indicative of a battery temperature Tb from a temperature sensor 51c that is attached to the battery 50.

The battery ECU 52 is connected to the HVECU 70 via the communication port. The battery ECU 52 outputs data on a state of the battery 50 to the HVECU 70, when necessary. The battery ECU 52 calculates a state of charge SOC on the basis of an integrated value of the battery current Ib from the current sensor 51b. The state of charge SOC is a ratio of a capacity of electric power that can be discharged from the battery 50 to a total capacity of the battery 50. The battery ECU 52 also calculates an input limit Win and an output limit Wout of the battery 50. The input limit Win is permissible charge electric power that can be stored in the battery 50. This input limit Win is set to be within a range equal to or smaller than a value 0 (zero) (i.e., this input limit Win is set to be equal to or smaller than a value 0), and is set to become larger (smaller as the value on a charged side) when the battery temperature Tb is low than when the battery temperature Tb is high and to become larger (smaller as the value on the charged side) when the state of charge SOC is high than when the state of charge SOC is low. More specifically, the input limit Win is set to increase as the battery temperature Tb decreases and to increase as the state of charge SOC increases. The output limit Wout is permissible discharge electric power that can be discharged from the battery 50. This output limit Wout is set to be within a range equal to or larger than the value 0 (zero) (i.e., this output limit Wout is set to be equal to or larger than the value 0), and is set to become smaller when the battery temperature Tb is low than when the battery temperature Tb is high and to become smaller when the state of charge SOC is low than when the state of charge SOC is high. More specifically, the output limit Wout is set to decrease as the battery temperature Tb decreases and to decrease as the state of charge SOC decreases. These are set to protect the battery 50 on the basis of a temperature characteristic and a state of charge characteristic of the battery 50.

Although not shown, the HVECU 70 is configured as a microprocessor that includes a CPU as a central component, and further includes, in addition to the CPU, a ROM that stores a processing program, a RAM that temporarily stores data, input and output ports, and a communication port. The HVECU 70 receives signals from various sensors via the input port. The signals that are received by the HVECU 70 include an ignition signal from an ignition switch 80, a signal indicative of a shift position SP from a shift position sensor 82 that detects an operation position of a shift lever 81, a signal indicative of an accelerator pedal operation amount Acc from an accelerator pedal position sensor 84 that detects a depression amount of an accelerator pedal 83, a signal indicative of a brake pedal position BP from a brake pedal position sensor 86 that detects a depression amount of a brake pedal 85, and a signal indicative of a vehicle speed V from a vehicle speed sensor 88.

As described above, the HVECU 70 is connected to the engine ECU 24, the motor ECU 40, and the battery ECU 52 via the communication port, and exchanges the various control signals and the data with the engine ECU 24, the motor ECU 40, and the battery ECU 52.

Note that, in the hybrid vehicle 20 of the embodiment, a parking position used during parking (a P position), a reverse position for reverse traveling (an R position), a neutral position (an N position), a drive position for forward traveling (a D position), and the like are prepared as the operation positions of the shift lever 81 (i.e., the shift positions SP detected by the shift position sensor 82).

In the hybrid vehicle 20 of the embodiment that is configured as described above, first, required torque Tr* that is required for traveling (required for the drive shaft 36) is set on the basis of the shift position SP, the accelerator pedal operation amount Acc, and the vehicle speed V. Then, the engine 22 and the motors MG1, MG2 are controlled such that the engine 22 is operated or stopped, charge/discharge electric power Pb (=Vb·Ib) of the battery 50 falls within a range defined by the input or output limit Win or Wout, and torque based on the required torque Tr* is output to the drive shaft 36.

Figure 2:
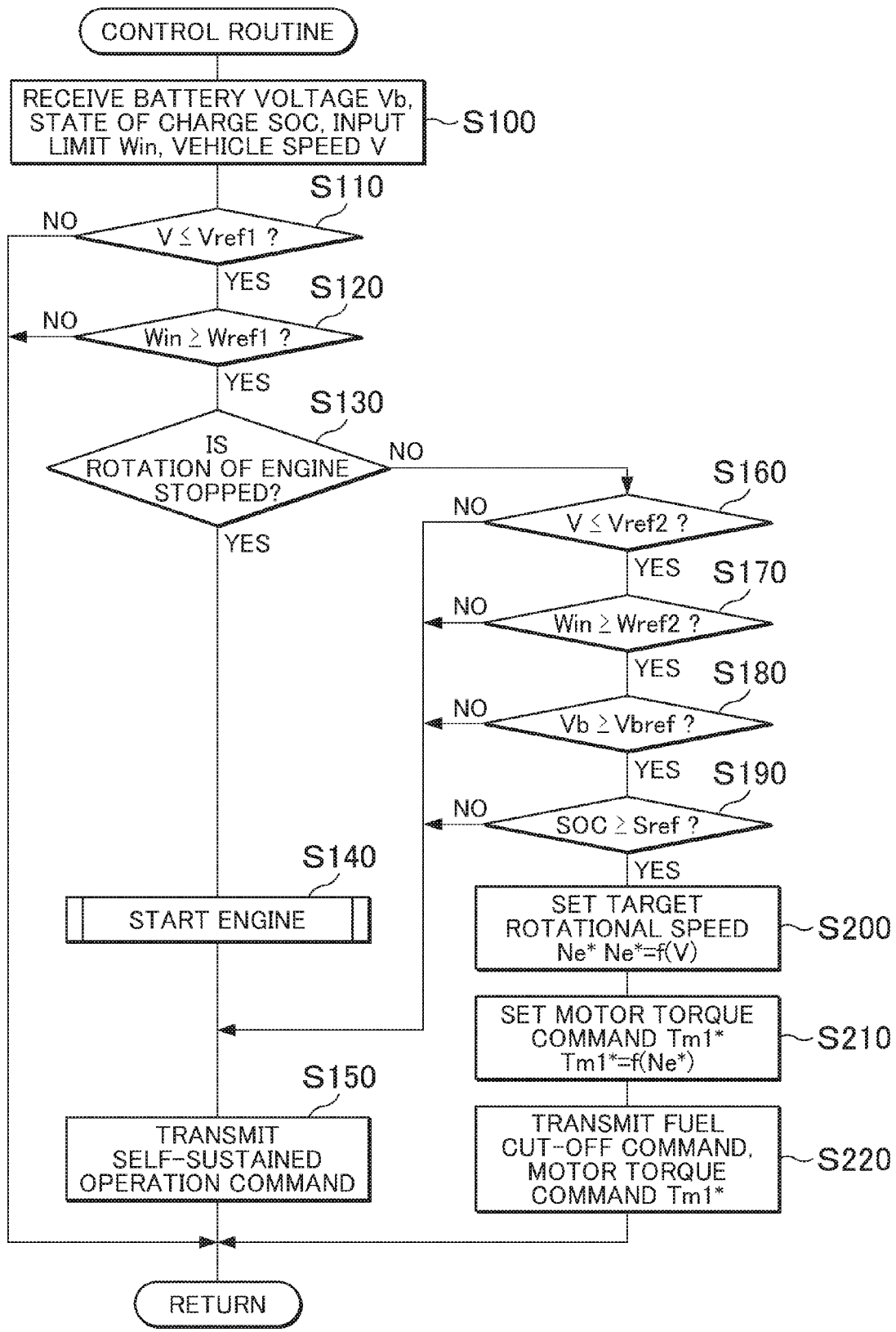
FIG. 2 is a flowchart of one example of a control routine that is repeatedly executed by an HVECU of the embodiment.

Next, a description will be made on an operation of the hybrid vehicle 20 of the embodiment that is configured as described above and, in particular, on an operation thereof in the case where the vehicle slides down when the shift position SP is the D position and the torque for forward traveling is output from the motor MG2. FIG. 2 is a flowchart of one example of a control routine that is repeatedly executed by the HVECU 70 of the embodiment when the shift position SP is the D position and the torque for forward traveling is output from the motor MG2. In parallel with the control routine in FIG. 2, the HVECU 70 sets a torque command Tm2* for the motor MG2 and transmits the torque command Tm2* to the motor ECU 40 such that the charge/discharge electric power Pb of the battery 50 falls within the range defined by the input or output limit Win or Wout of the battery 50 and the torque based on the required torque Tr* is output to the drive shaft 36. When receiving the torque command Tm2*, the motor ECU 40 executes the switching control for the switching elements of the inverter 42 such that the motor MG2 is driven in accordance with the torque command Tm2*. In addition, in the embodiment, rotation of the engine 22 is in a stopped state when the control routine in FIG. 2 is executed for the first time (immediately after the motor MG2 starts outputting the torque for forward traveling).

Once the control routine in FIG. 2 is executed, the HVECU 70 receives the vehicle speed V as well as the battery voltage Vb, the state of charge SOC, and the input limit Win of the battery 50 (step S100). Here, as the vehicle speed V, a value detected by the vehicle speed sensor 88 is received. The battery voltage Vb, the state of charge SOC, and the input limit Win of the battery 50 are received through the communication from the motor ECU 40.

Once the data is received as described above, the vehicle speed V is compared with a negative threshold Vref1 (step S110). Here, the threshold Vref1 is a threshold that is used for tentative detection of sliding down of the vehicle, and, for example, −0.7 km/h, −1 km/h, or −1.3 km/h can be used as the threshold Vref1. When the vehicle speed V is larger than the threshold Vref1, it is determined that the sliding down of the vehicle is not tentatively detected. Then, this routine is terminated.

When the vehicle speed V is equal to or smaller than the threshold Vref1 in step S110, it is determined that the sliding down of the vehicle is tentatively detected. Then, the input limit Win of the battery 50 is compared with a negative threshold Wref1 (step S120). In the case where the vehicle slides down when the motor MG2 outputs the torque for forward traveling, the regenerative operation of the motor MG2 is performed. When the input limit Win of the battery 50 is relatively small (relatively large as a value on the charged side), a possibility that the torque for forward traveling (regenerative torque) from the motor MG2 is limited to a relatively small value is low. However, when the input limit Win of the battery 50 is relatively large (relatively small as a value on the charged side), the torque for forward traveling (the regenerative torque) from the motor MG2 tends to be limited to a value whose absolute value is relatively small. Accordingly, at this time, a sliding down speed of the vehicle tends to become relatively large. The threshold Wref1 is a threshold that is used to determine whether the torque for forward traveling from the motor MG2 is likely to be limited to the value whose absolute value is relatively small, and, for example, −4.7 kW, −5 kW, or −5.3 kW can be used as the threshold Wref1 when the input limit Win is set within a range of approximately 0 kW to −30 kW. When the input limit Win of the battery 50 is smaller than the threshold Wref1, it is determined that the torque for forward traveling from the motor MG2 is not likely to be limited to the value whose absolute value is relatively small. Then, this routine is terminated.

When the input limit Win of the battery 50 is equal to or larger than the threshold Wref1 (this case corresponds to a case where the permissible charge electric power of the invention is equal to or smaller than first prescribed electric power) in step S120, it is determined that the torque for forward traveling from the motor MG2 is likely to be limited to the value whose absolute value is relatively small. Then, it is determined whether the rotation of the engine 22 is in a stopped state (step S130). When it is determined that the rotation of the engine 22 is in the stopped state, the engine 22 is started (step S140). Here, the engine 22 is started through cooperative control by the HVECU 70, the engine ECU 24, and the motor ECU 40 by controlling the motor MG1 such that the engine 22 is cranked by cranking torque from the motor MG1 and by controlling the engine 22 such that fuel injection control, ignition control, and the like for the engine 22 are started when the rotational speed Ne of the engine 22 reaches a prescribed rotational speed Nst (for example, 600 rpm, or 800 rpm) or larger. Once the engine 22 is started, thereafter, the rotation of the engine 22 is prohibited from being stopped at least until the sliding down of the vehicle is no longer detected (until the vehicle speed V becomes larger than the threshold Vref1).

Subsequently, a self-sustained operation command for the engine 22 is transmitted to the engine ECU 24 and the motor ECU 40 (step S150), and this routine is terminated. When receiving the self-sustained operation command for the engine 22, the engine ECU 24 executes intake air amount control, the fuel injection control, the ignition control, and the like for the engine 22 such that the engine 22 rotates at a prescribed rotational speed Ne1 (for example, 1000 rpm, or 1200 rpm). When receiving the self-sustained operation command for the engine 22, the motor ECU 40 sets a torque command Tm1* for the motor MG1 to a value 0 (zero), and executes the switching control for the switching elements of the inverter 41 such that the motor MG1 is driven in accordance with this torque command Tm1*.

When it is determined in step S130 that the rotation of the engine 22 is not in the stopped state, that is, the engine 22 rotates, the vehicle speed V is compared with a threshold Vref2 that is smaller than the threshold Vref1 (step S160). Here, the threshold Vref2 is a threshold that is used for the detection (decisive detection) of the sliding down of the vehicle, and, for example, −1.7 km/h, −2 km/h, or −2.3 km/h can be used as the threshold Vref2. When the vehicle speed V is larger than the threshold Vref2, it is determined that the sliding down of the vehicle is tentatively detected but is not detected (decisively detected). Then, the self-sustained operation command for the engine 22 is transmitted to the engine ECU 24 and the motor ECU 40 (step S150), and this routine is terminated.

When the vehicle speed V is equal to or smaller than the threshold Vref2 in step S160, it is determined that the sliding down of the vehicle is detected (decisively detected). Then, the input limit Win of the battery 50 is compared with a threshold Wref2 that is equal to or larger (smaller as a value on the charged side) than the threshold Wref1 (step S170). Here, the threshold Wref2 is a threshold that is used in a manner similar to a manner in which the threshold Wref1 is used, and, for example, −3.7 kW, −4 kW, or −4.3 kW can be used as the threshold Wref2 when the input limit Win is set within the range of approximately 0 kW to −30 kW. When the input limit Win of the battery 50 is smaller than the threshold Wref2, the self-sustained operation command for the engine 22 is transmitted to the engine ECU 24 and the motor ECU 40 (step S150), and this routine is terminated.

When the input limit Win of the battery 50 is equal to or larger than the threshold Wref2 (this case corresponds to a case where the permissible charge electric power of the invention is equal to or smaller than second prescribed electric power) in step S170, the battery voltage Vb of the battery 50 is compared with a threshold Vbref (step S180), and the state of charge SOC of the battery 50 is compared with a threshold Sref (step S190). Here, for example, a permissible lower limit voltage of the battery 50 (for example, approximately 150 V when approximately 200 V is a rated voltage), or a value slightly higher than the permissible lower limit voltage can be used as the threshold Vbref. For example, a permissible lower limit ratio in the battery 50 (20%, 22%, 25%, or the like), a value slightly higher than the permissible lower limit ratio can be used as the threshold Sref.

When the battery voltage Vb of the battery 50 is equal to or higher than the threshold Vbref and the state of charge SOC of the battery 50 is equal to or higher than the threshold Sref in steps S180, S190, a target rotational speed Ne* of the engine 22 is set on the basis of the vehicle speed V (step S200), and the torque command Tm1* for the motor MG1 is set such that the engine 22 rotates at the target rotational speed Ne* (step S210).

Figure 3:
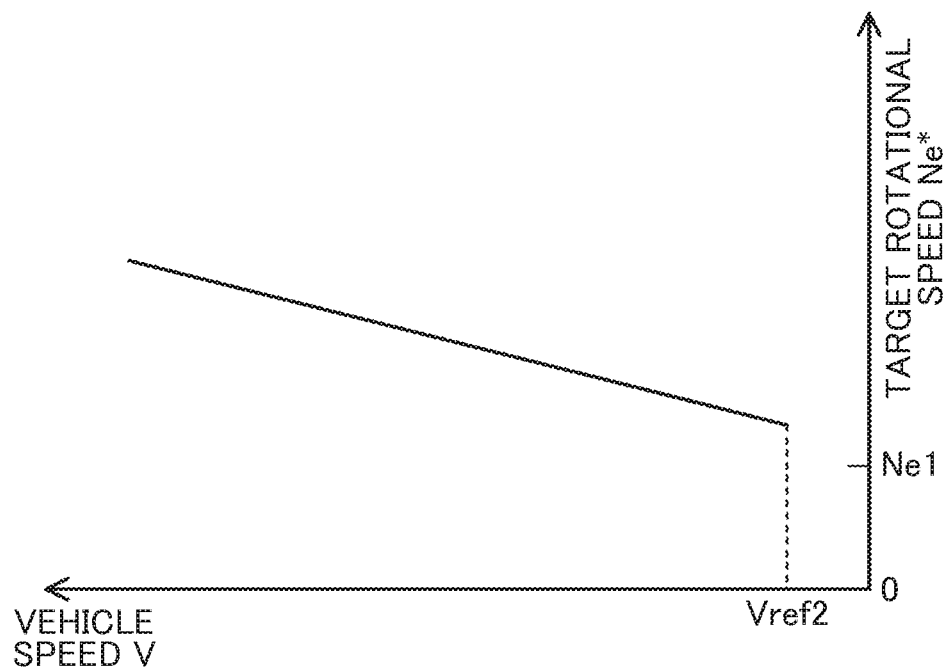
FIG. 3 is an explanatory diagram that shows one example of a target speed setting map.

Here, in the embodiment, a relationship between the vehicle speed V and the target rotational speed Ne* of the engine 22 is defined in advance and stored as a target speed setting map in the ROM (not shown). Then, when the vehicle speed V is provided, the corresponding target rotational speed Ne* of the engine 22 is derived from this map. In this way, the target rotational speed Ne* of the engine 22 is set. One example of the target speed setting map is shown in FIG. 3. As shown in the map, the target rotational speed Ne* of the engine 22 is set within a range larger than the above-described prescribed rotational speed Ne1, and is set to become larger when the vehicle speed V is small (i.e., when a sliding down speed of the vehicle is large) than when the vehicle speed V is large. More specifically, the target rotational speed Ne* of the engine 22 is set to increase as the vehicle speed V decreases. In other words, the target rotational speed Ne* of the engine 22 is set to increase as the sliding down speed of the vehicle increases. That is, the rotational speed Ne of the engine 22 is increased as the sliding down speed of the vehicle increases. A reason for this will be described below.

In addition, the torque command Tm1* for the motor MG1 is set by the following expression (1) by using the rotational speed Ne and the target rotational speed Ne* of the engine 22. The expression (1) is a relational expression in speed feedback control for making the engine 22 rotate at the target rotational speed Ne*. In the expression (1), "k1" in a first term on a right side is a gain of a proportional term, and "k2" in a second term on the right side is a gain of an integral term.

$$Tm1^* = k1 \cdot (Ne^* - Ne) + k2 \cdot \int (Ne^* - Ne) dt \quad (1)$$

Next, a fuel cut-off command for the engine 22 is transmitted to the engine ECU 24, and the torque command Tm1* for the motor MG1 is transmitted to the motor ECU 40 (step S220). Then, this routine is terminated. Once the engine ECU 24 receives the fuel cut-off command, the engine ECU 24 stops fuel injection when the fuel injection of the engine 22 is being performed, and continues stopping fuel injection when the fuel injection is stopped. Once the motor ECU 40 receives the torque command Tm1*, the motor ECU 40 executes the switching control for the switching elements of the inverter 41 such that the motor MG1 is driven in accordance with the torque command Tm1*. In this case, the engine 22 in the state where the fuel injection is stopped is driven by the motor MG1 such that the engine 22 rotates at the target rotational speed Ne*.

As described above, in the case where the input limit Win of the battery 50 is equal to or larger than the threshold Wref2 when the sliding down of the vehicle is detected, the engine 22 in the state where the fuel injection is stopped is driven by the motor MG1. In this way, the electric power can be consumed by the motor MG1. Accordingly, it is possible to prevent the torque for forward traveling (the regenerative torque) from the motor MG2 from being relatively significantly limited (limited to the value whose absolute value is relatively small). As a result, it is possible to prevent the sliding down speed of the vehicle from becoming relatively large. Note that, when the engine 22 in the state where the fuel injection is stopped is driven by the motor MG1, torque from the motor MG1 acts on the drive shaft 36 via the planetary gear 30. The torque from the motor MG1 acts as torque in such a direction as to hinder forward traveling.

However, because this torque is basically sufficiently smaller than (for example, approximately one hundredth to one twentieth of) the torque that is output from the motor MG2 and acts on the drive shaft 36, a possibility that this torque causes a problem is low. In addition, because the motor MG1 is a device used for traveling, a rated value thereof is basically larger than that of auxiliary equipment connected to the power line 54 (for example, a compressor of an air conditioner, or a DC/DC converter). Accordingly, the electric power that is generated by the operation (the regenerative operation) of the motor MG2 during the sliding down of the vehicle can be further sufficiently consumed by the motor MG1.

In addition, in the embodiment, as described above, the target rotational speed Ne* of the engine 22 is set to become larger when the vehicle speed V is small (i.e., when a sliding down speed of the vehicle is large) than when the vehicle speed V is large. The electric power that is generated by the regenerative operation of the motor MG2 increases as the sliding down speed of the vehicle increases. However, as the electric power that is generated by the regenerative operation of the motor MG2 increases, the target rotational speed Ne* (the rotational speed Ne) of the engine 22 is increased so as to increase the electric power consumption of the motor MG1. In this way, it is possible to further appropriately prevent the torque for forward traveling (the regenerative torque) from the motor MG2 from being relatively significantly limited.

Furthermore, in the embodiment, when the vehicle speed V reaches the threshold Vref1 or smaller, the engine 22 is started, and a self-sustained operation of the engine 22 is started. Then, when the vehicle speed V reaches the threshold Vref2 or smaller, the fuel injection of the engine 22 is stopped, and the engine 22 is driven by the motor MG1 such that the engine 22 rotates at a rotational speed larger than a rotational speed before the vehicle speed V reaches the threshold Vref2 or smaller (i.e., at a rotational speed larger than a rotational speed at a time when the self-sustained operation of the engine 22 is performed). In this way, the electric power consumption of the motor MG1 can be further promptly increased, as compared to a case in which, when the vehicle speed V reaches the threshold Vref2 or smaller, the engine 22 is started, the fuel injection of the engine 22 is stopped thereafter, and then, the engine 22 starts to be driven by the motor MG1.

When the battery voltage Vb of the battery 50 is lower than the threshold Vbref in step S180, and when the state of charge SOC of the battery 50 is lower than the threshold Sref in step S190, the self-sustained operation command for the engine 22 is transmitted to the engine ECU 24 and the motor ECU 40 (step S150). Then, this routine is terminated. As described above, when fuel injection is stopped and the engine 22 is driven by the motor MG1, there is a possibility that the battery voltage Vb and the state of charge SOC of the battery 50 are decreased depending on the electric power consumption of the motor MG1. In the embodiment, when the battery voltage Vb of the battery 50 is lower than the threshold Vbref, and when the state of charge SOC of the battery 50 is lower than the threshold Sref, the self-sustained operation of the engine 22 is performed, that is, fuel injection is not stopped and the engine 22 is not driven by the motor MG1. In this way, the battery voltage Vb and the state of charge SOC of the battery 50 are prevented from being further decreased. Thus, the battery 50 can be protected.

In the hybrid vehicle 20 of the embodiment that has been described so far, in the case where the input limit Win of the battery 50 is equal to or larger than the threshold Wref1 when the sliding down of the vehicle is tentatively detected before being detected (decisively detected), the engine 22 is started, and the self-sustained operation of the engine 22 is started. Then, in the case where the input limit Win of the battery 50 is equal to or larger than the threshold Wref2 when the sliding down of the vehicle is detected (decisively detected), the fuel injection of the engine 22 is stopped, and the engine 22 is driven by the motor MG1 such that the engine 22 rotates at the rotational speed larger than the rotational speed before the sliding down of the vehicle is detected (i.e., at the rotational speed larger than the rotational speed at the time when the self-sustained operation of the engine 22 is performed). In this way, the rotational speed Ne of the engine 22 can be promptly increased, and the electric power consumption of the motor MG1 can be promptly increased, as compared to the case in which, when the sliding down of the vehicle is detected, the engine 22 is started, and thereafter fuel injection is stopped and the engine 22 starts to be driven by the motor MG1. As a result, it is possible to prevent the torque for forward traveling (the regenerative torque) from the motor MG2 from being relatively significantly limited (limited to the value whose absolute value is relatively small). Therefore, it is possible to prevent the sliding down speed of the vehicle from becoming relatively large.

At this time, the engine 22 in the state where fuel injection is stopped is driven by the motor MG1 such that the engine 22 rotates at the larger rotational speed when the vehicle speed V is small (i.e., when a sliding down speed of the vehicle is large) than when the vehicle speed V is large. The electric power that is generated by the regenerative operation of the motor MG2 increases as the sliding down speed of the vehicle increases. However, as the electric power that is generated by the regenerative operation of the motor MG2 increases, the rotational speed Ne of the engine 22 is increased so as to increase the electric power consumption of the motor MG1. In this way, it is possible to further appropriately prevent the torque for forward traveling (the regenerative torque) from the motor MG2 from being relatively significantly limited.

In the hybrid vehicle 20 of the embodiment, in the case where the input limit Win of the battery 50 is equal to or larger than the threshold Wref2 when sliding down of the vehicle is detected (decisively detected), the engine 22 in the state where fuel injection is stopped is driven by the motor MG1 such that the engine 22 rotates at the rotational speed that falls within the range larger than the prescribed rotational speed Ne1 and that is larger when the vehicle speed V is small (i.e., when a sliding down speed of the vehicle is large) than when the vehicle speed V is large. However, the engine 22 in the state where fuel injection is stopped may be driven by the motor MG1 such that the engine 22 rotates at a uniform rotational speed that falls within the range larger than the prescribed rotational speed Ne1.

In the embodiment, the engine 22 may be regarded as the "engine" of the invention, the motor MG1 may be regarded as the "first motor" of the invention, the planetary gear 30 may be regarded as the "planetary gear" of the invention, the motor MG2 may be regarded as the "second motor" of the invention, the battery 50 may be regarded as the "battery" of the invention, and the HVECU 70, the engine ECU 24, and the motor ECU 40 may be regarded as the "electronic control unit" of the invention.

While the embodiment has been described, the embodiment is an example, and the invention is not limited to the embodiment. The invention can be implemented in various modes without departing from the scope of the invention.

The invention can be used in a hybrid vehicle manufacturing industry, and the like.

What is claimed is:
1. A hybrid vehicle comprising:
an engine;
a first motor;
a planetary gear in which three rotational elements are connected to a rotational shaft of the first motor, an output shaft of the engine, and a drive shaft connected to an axle such that the rotational shaft, the output shaft, and the drive shaft are arranged in a stated order in a collinear diagram;
a second motor connected to the drive shaft;
a battery that exchanges electric power with the first motor and the second motor; and
an electronic control unit configured to:
control at least the second motor such that the hybrid vehicle travels in a state where charge electric power of the battery is within a range defined by permissible charge electric power and discharge electric power of the battery is in a range defined by permissible discharge electric power;
control the engine such that the engine is started and a self-sustained operation of the engine is performed in a case where i) torque for forward traveling is output from the second motor, ii) sliding down of the hybrid vehicle is tentatively detected before the sliding down is detected, and iii) the permissible charge electric power is equal to or smaller than first prescribed electric power and rotation of the engine is in a stopped state;
execute drive control that controls the engine such that fuel injection of the engine is stopped and controls the first motor such that the engine is driven by the first motor at a rotational speed larger than a rotational speed before the sliding down is detected in a case where i) the sliding down is detected after the self-sustained operation of the engine is started and ii) the permissible charge electric power is equal to or smaller than second prescribed electric power that is equal to or smaller than the first prescribed electric power; and
continue the self-sustained operation of the engine in a case where the sliding down is not detected or the permissible charge electric power is larger than the second prescribed electric power after the self-sustained operation of the engine is started.

2. The hybrid vehicle according to claim 1, wherein the electronic control unit is configured to execute the drive control such that the engine is driven at a larger rotational speed when a sliding down speed is large than when the sliding down speed is small in the case where i) the torque for forward traveling is output from the second motor, ii) the sliding down is detected, and iii) the permissible charge electric power is equal to or smaller than the second prescribed electric power.

3. The hybrid vehicle according to claim 1, wherein the electronic control unit is configured not to execute the drive control when a voltage of the battery is lower than a prescribed voltage or when a state of charge of the battery is lower than a prescribed ratio even in the case where i) the torque for forward traveling is output from the second motor, ii) the sliding down is detected, and iii) the permissible charge electric power is equal to or smaller than the second prescribed electric power.

* * * * *